United States Patent [11] 3,632,156

| [72] | Inventor | Frederick G. Schweser<br>P.O. Box 5 West Military Rd., Fremont, Nebr. 68025 |
|---|---|---|
| [21] | Appl. No. | 848,279 |
| [22] | Filed | Aug. 7, 1969 |
| [45] | Patented | Jan. 4, 1972 |

[54] FUN BUGGY VEHICLE
6 Claims, 6 Drawing Figs.

[52] U.S. Cl. .................................................... 296/31 P, 296/28 R
[51] Int. Cl. .................................................... B62d 29/04
[50] Field of Search ........................................ 296/28, 31, 31 P, 35

[56] References Cited
UNITED STATES PATENTS

| 2,876,037 | 3/1959 | Ingolia et al. | 296/28 |
| 3,110,504 | 11/1963 | Myers | 280/36 B |
| 3,331,627 | 7/1967 | Schroder et al. | 296/31 P |
| 3,409,323 | 11/1968 | Schweser | 296/28 |

OTHER REFERENCES

Road & Track, September 1968, " Meet the Todd" pages 77– 79, Volume 20, No. 1.
Hot Rod, March 1969, " The Lightweights" pages 34– 38, Vol. 22, No. 3.

*Primary Examiner*—Leo Friaglia
*Assistant Examiner*—Leslie J. Paperner
*Attorney*—Gustave Miller ABSTRACT: This invention is a one-piece fun buggy or dune or beach buggy vehicle body insert for use with a vehicle chassis having spaced-apart chassis side bars, the buggy insert body having outwardly extending inverted side channels complementary to the chassis bars to support the vehicle body insert on such bars. In addition, the buggy floor and seat bottoms depend from the inverted side channels, so that the weight of the occupants is mainly suspended below the chassis side bars rather than supported thereabove as customary.

PATENTED JAN 4 1972 3,632,156
SHEET 1 OF 3
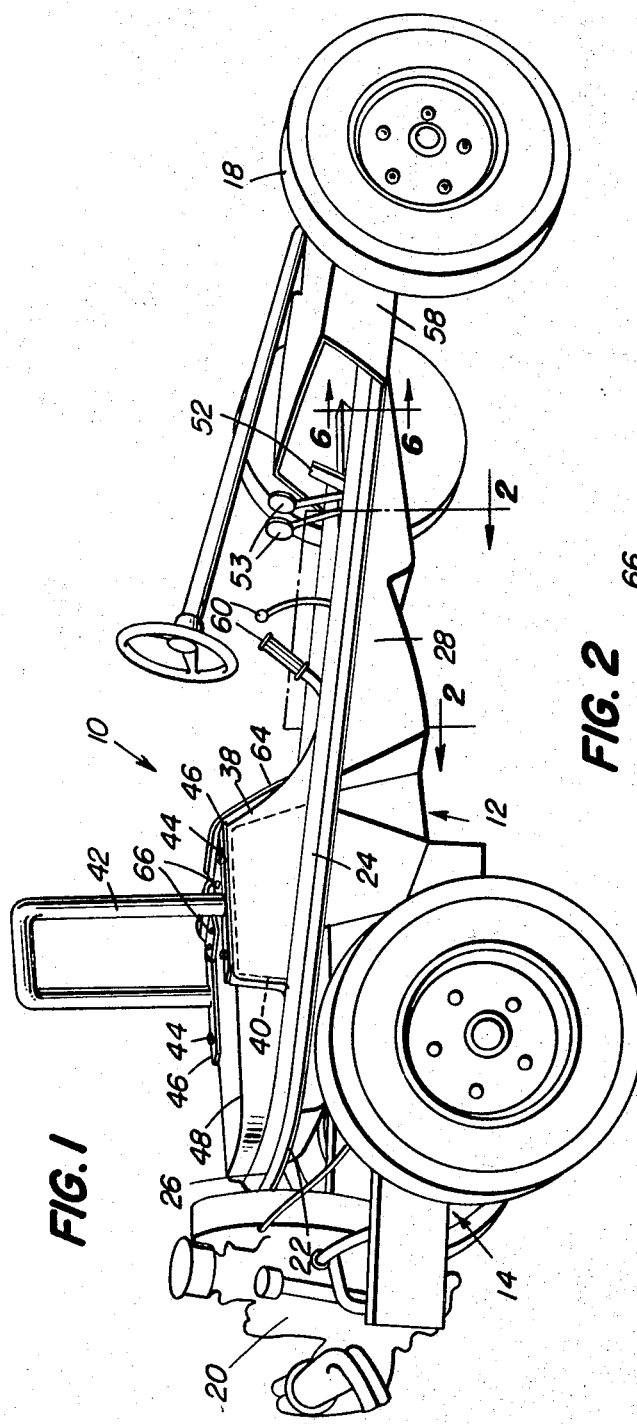
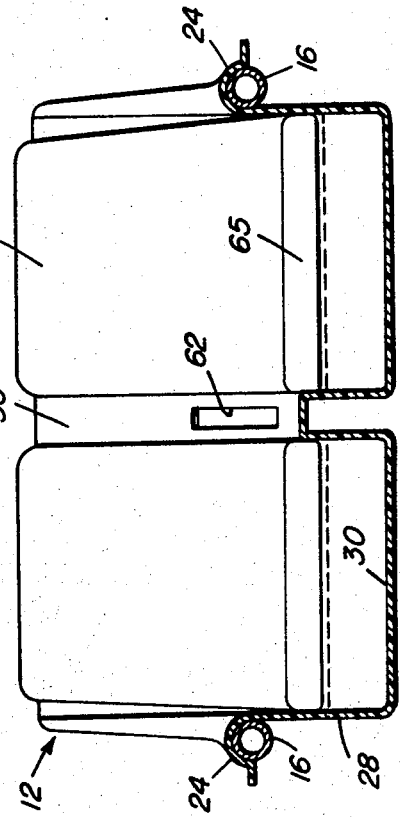
INVENTOR
Frederick G. Schweser
BY Gustave Miller
ATTORNEY

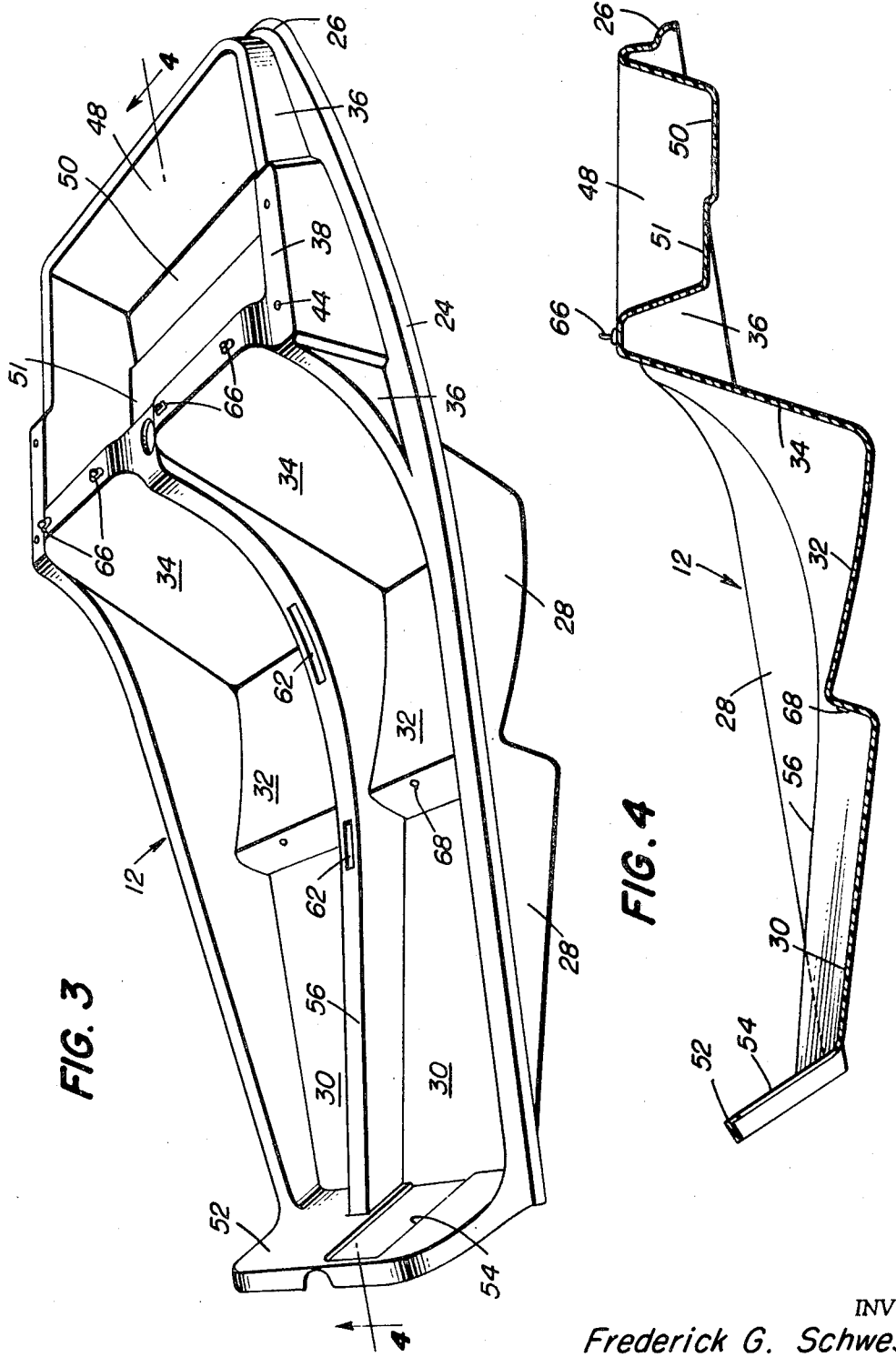

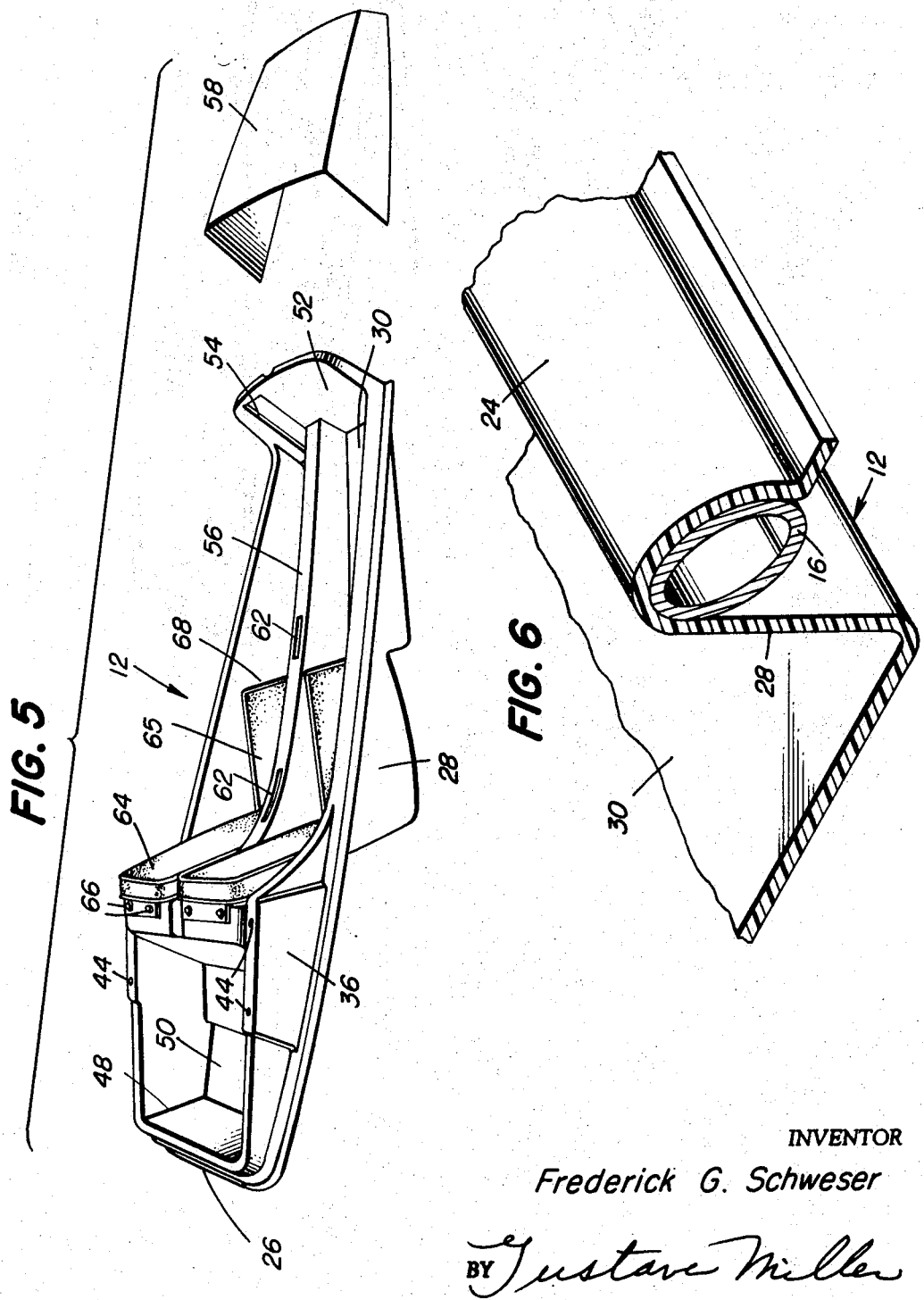

FUN BUGGY VEHICLE

BACKGROUND OF THE INVENTION

Motored buggy vehicles, often called fun buggies, or dune or beach buggies, are intended for sporting use on ocean beaches, on dunes and on other hard to traverse surfaces, and generally not for highway travel, except as may be incidental to reaching a desired area suitable for their special use. They are usually high powered in relation to their weight, and many, or probably most, of them are assembled from kits by the operators. Because of their use in rough areas, they are somewhat unstable, and roll bars are customary to protect the occupants in case of rollover. One example of such a buggy is shown in this applicant's prior U.S. Pat. No. 3,409,323.

BRIEF SUMMARY OF THE INVENTION

The buggy vehicle of this invention has a chassis wherein there are oppositely disposed side chassis bars, normally used to support the vehicle body thereon. Instead, in this invention, the vehicle body, in the form of a one-piece insert, is provided with inverted channel portions on its opposite longitudinal sides which are located above the seat bottoms and the floor, the channel portions being complementary to the chassis side bars and thus, when placed on the chassis side bars, support the vehicle body and the weight of the occupants therein below and suspended from the chassis side bars, thus greatly increasing the stability of the vehicle and making it less likely to turn over, even though it also provides a roll bar to take care of a turnover when the vehicle is used on a precipitous hillside greater than that it can normally traverse.

The body insert is made preferably of high-impact plastic or fiberglass reinforced plastic, but also may be made of suitable metals.

BRIEF DESCRIPTION OF THE FIGS.

FIG. 1 is a perspective view of the assembled invention.

FIG. 2 is a section on line 2—2 of FIG. 1.

FIG. 3 is a perspective view of the one-piece vehicle body insert.

FIG. 4 is a longitudinal section on line 4—4 of FIG. 3.

FIG. 5 is an exploded perspective view of the insert body, together with seatback and seat bottom pads, and a hood extending over the insert front wall.

FIG. 6 is an enlarged perspective detail view on line 6—6 of FIG. 1.

There is shown at 10 the assembled fun, dune, or beach buggy of this invention, including the one-piece vehicle body insert 12 of this invention supported on the chassis 14. The feature of the chassis 14 that particularly cooperates with the body insert 12 of this invention is the pair of oppositely disposed spaced-apart chassis side bars 16 which connect the steering assembly and front wheels 18 to the rear power pack and wheels 20. An incidental feature is that these side bars 16 may also be joined together by a rear chassis bar 22. The one piece body vehicle insert 12 is made of suitable metal or plastic, such as high-impact plastic or fiberglass reinforced plastic so that it will have suitable strength for the purpose for which it is used. Extending along longitudinal opposite sides of the insert 12 are integral inverted channels 24 complementary to the chassis bars 16, and there may also be provided an inverted rear channel 26 complementary to the rear chassis bar 22, when such bar 22 is present. As illustrated, the insert 12 fits in between and on bars 16 and 22 and is snugly supported by these inverted channels 24 and 26, these channels 24 and 26 at least partially wrapping around their chassis bars to fully support the one-piece insert 12 thereon, including the usual occupant and load that may be expected to be carried. While such snug fit and the roll bar securing means described below, is usually sufficient to keep the insert in position in normal use, suitable securing means, such as rivets or bolts and nuts (not shown), or "pop" rivets, such as shown in FIG. 9 of applicant's above-mentioned prior patent, may be used through the channels and the chassis bars in a conventional manner to provide increased securement of insert 12 to chassis 14.

Depending from the inverted side channels 24 are inner sidewalls 28. Supported by and between these sidewalls 28 are the vehicle floors 30 and seat bottoms 32, the seat bottoms 32 extending from seatbacks 34 which extend from below to above the side inverted channels 24, the sidewalls 28 extending above the channels 24 at 36 behind the seatbacks 34. The upper sidewalls 36 form part of upper inverted channels 38 that fit over upwardly extending walls 40 supported on the chassis 14 and providing a strong support for an inverted U-roll bar 42. The bolts or fastenings 44 may be the only securing means between the insert 12 and the chassis 14, or they may be supplemented by the previously mentioned fastenings (not shown) between the channels 24 and chassis bars 16. Behind the seatbacks 34, a depending compartment 48 is integrally supported by the sidewalls 36 and the compartment 48 is provided with a depressed bottom floor 50 providing a sump in which the vehicle fuel tank may be supported, the higher level compartment bottom 51 providing space for storage space as may be desired.

Across the front ends of the floor bottoms 30 and sidewalls 28 there extends a front wall or "firewall" 52 having an opening 54 on the driver's side for the foot controls 53 to extend through. The seat bottoms 32 and floors 30 are separated by an inverted center channel 56 providing a channel through which the control rod may extend from the foot controls 53 to the power pack and rear wheels 20. A separate hood 58 may be provided to fit over the front wall 52. Hand controls 60 extend through slots 62 in the center control channel 56. Seatback pads 64 and seat bottom pad 65 are held in place by suitable fasteners 66 and 68.

ASSEMBLY OF THE INVENTION

To assemble the insert 12 on the chassis 14, the roll bar 42 is disconnected from the chassis 14, and the insert 12 is placed thereover, with the inverted channels 24 and 26 fitted over the chassis bars 16 and 22. The roll bar 42 than has its feet 46 secured by bolts 44 thus also securing the insert 12 in position on the chassis 14, with the controls 53 and 60 extending through their appropriate openings. The hood 58 is then appropriately fastened in place, and the vehicle is ready for use.

In the drawings, like numbers refer to like parts, and for the purposes of explication, set forth below are the numbered parts of the improved Fun Buggy Vehicle:

10 assembled buggy of this invention
12 one-piece body insert
14 chassis
16 spaced-apart chassis side bars
18 steering assembly and front wheels
20 rear power pack and rear wheels
22 rear chassis bar joining side bars 16
24 side inverted supporting channels
26 rear inverted supporting channels
28 inner sidewalls
30 vehicle floor
32 seat bottoms
34 seat backs
36 upper sidewalls
38 upper inverted channels
40 upwardly extending chassis supported walls
42 rollover inverted U-bar
44 bolt fastenings of 46 to 40
46 roll bar feet
48 rear compartment depending from 36 and 38
50 depressed compartment floor or sump
51 higher bottom of 48
52 front wall or "firewall"
53 foot controls
54 foot controls opening in 52
56 inverted center control channel
58 front hood
60 hand controls
62 slots for 60 in 56
64 seatback pads for 34
65 seat bottom pads for 32

66 fasteners for 64
68 fasteners for 65

Although this invention has been described in considerable detail, such description is intended as being illustrative rather than limiting, since the invention may be variously embodied.

Having thus set forth and disclosed the nature of this invention, what is claimed is:

1. In combination with a vehicle (10) chassis (14) having a pair of spaced-apart chassis side bars (16) connecting the front (18) and rear (20) parts thereof; the improvement comprising a one-piece integral body insert (12) having outwardly extending inverted channel portions (24) extending along its opposite longitudinal sides, said inverted channel portions (24) being complementary to the upper surfaces of said spaced-apart chassis bars (16) for supporting said one-piece body insert (12) on said chassis bars (16), said body insert (12) having seat and floor portion sidewalls (28) depending integrally from said inverted channel portions, (24), seat bottoms (32) and floor portions (30) extending integrally between said sidewalls (28) below said inverted channel portions (24), seatbacks (34) extending integrally from said seat bottoms (32) from below to above said channel portions (24), said sidewalls (28) extending above (36) said channel portions (24) at said seat backs (34) and continuing therebehind, and a compartment (48) depending integrally from said rearward sidewalls (36) behind said seatbacks (34) said upwardly extending sidewalls (36) and said depending compartment (48) providing inverted channels (38) complementary to and supported on upwardly extending chassis wall members (40), said chassis upstanding walls (40) providing roll bar (42) means supports.

2. The combination of claim 1, and a gasoline tank supporting sump (50) in the floor (51) of said compartment (48).

3. The combination of claim 1, a transverse front wall (52) at the forward end of said floor portions (30), and an inverted channel wall divider (56) extending from said seat backs (34) to said front wall (52).

4. The combination of claim 1, said chassis (14) having a chassis rear bar (22) connecting said chassis side bars (16); said insert body (12) having an inverted rear channel portion (26) complementary to said chassis rear bar (22).

5. The combination of claim 1, and a divider wall (56) separating said seat bottoms (32) and backs (34) into two seating areas comprising an inverted channel (56) through which the chassis controls may extend.

6. The combination of claim 1, the chassis (14) upstanding roll bar (42) support walls (40) being at opposite sides behind said seatbacks (34), said rearward upwardly being secured to said sidewalls (40) extending walls (36) by roll bar (42) fastening means (44).

* * * * *